United States Patent
Grosseholz et al.

(10) Patent No.: US 7,090,573 B2
(45) Date of Patent: Aug. 15, 2006

(54) METHOD AND DEVICE FOR PROCESSING FILLETS OF FISH (CONVEYOR BELT FILLET PRODUCTION)

(75) Inventors: Werner Grosseholz, Krummesse (DE); Olaf Schwarz, Wismar (DE)

(73) Assignee: Nordischer Maschinenbau Rud. Baader GmbH Co. KG, Lubeck (DE)

( * ) Notice: Subject to any disclaimer, the term of this patent is extended or adjusted under 35 U.S.C. 154(b) by 0 days.

(21) Appl. No.: 10/472,958

(22) PCT Filed: Mar. 28, 2002

(86) PCT No.: PCT/EP02/03523

§ 371 (c)(1),
(2), (4) Date: Sep. 26, 2003

(87) PCT Pub. No.: WO02/078453

PCT Pub. Date: Oct. 10, 2002

(65) Prior Publication Data

US 2004/0077301 A1 Apr. 22, 2004

(30) Foreign Application Priority Data

Mar. 31, 2001 (DE) .............................. 101 17 304

(51) Int. Cl.
*A22C 25/16* (2006.01)

(52) U.S. Cl. ............................................. 452/161

(58) Field of Classification Search ............. 452/125, 452/127, 149, 152, 153, 161, 162
See application file for complete search history.

(56) References Cited

U.S. PATENT DOCUMENTS

| | | | | | |
|---|---|---|---|---|---|
| 2,215,114 | A | * | 9/1940 | Baader et al. | 452/127 |
| 2,427,626 | A | * | 9/1947 | Savrda et al. | 452/135 |
| 3,739,428 | A | * | 6/1973 | Bartels et al. | 452/127 |
| 4,203,179 | A | * | 5/1980 | Braeger | 452/127 |
| 4,222,152 | A | * | 9/1980 | Braeger | 452/127 |
| 4,649,604 | A | * | 3/1987 | Braeger | 452/127 |
| 4,920,875 | A | * | 5/1990 | Schill | 99/589 |
| 5,211,097 | A | * | 5/1993 | Grasselli | 83/698.11 |
| 5,558,573 | A | * | 9/1996 | Basile et al. | 452/127 |
| 5,779,531 | A | | 7/1998 | Braeger et al. | |
| 6,244,950 | B1 | * | 6/2001 | Long et al. | 452/127 |

FOREIGN PATENT DOCUMENTS

| | | |
|---|---|---|
| DE | 680 720 | 9/1939 |
| DE | 1 810 673 | 6/1970 |

(Continued)

*Primary Examiner*—Peter M. Poon
*Assistant Examiner*—David J. Parsley
(74) *Attorney, Agent, or Firm*—Mattingly, Stanger, Malur & Brundidge, P.C.

(57) ABSTRACT

A method and apparatus for processing fish fillets includes subjecting fish fillets lying on a skin side to a brief pulling cut in the tail region and a splitting separation by a stationary separating edge which, when the fillets approach, enters in the region of the pulling cut between skin and flesh layers and separates the two layers from each other, while at the same time a pull is exerted on the skin layer. Pressure is exerted on the flesh side of the fillet in the input region thereof against the separating edge, and the pulling cut is triggered under the control of a signal, effected in a few strokes and interrupted again immediately afterwards under the control of the signal, whereupon for continuation of the final separating operation the separating edge enters the region of the pulling cut between skin and fillet flesh layers.

14 Claims, 4 Drawing Sheets

FOREIGN PATENT DOCUMENTS

Figure 1:
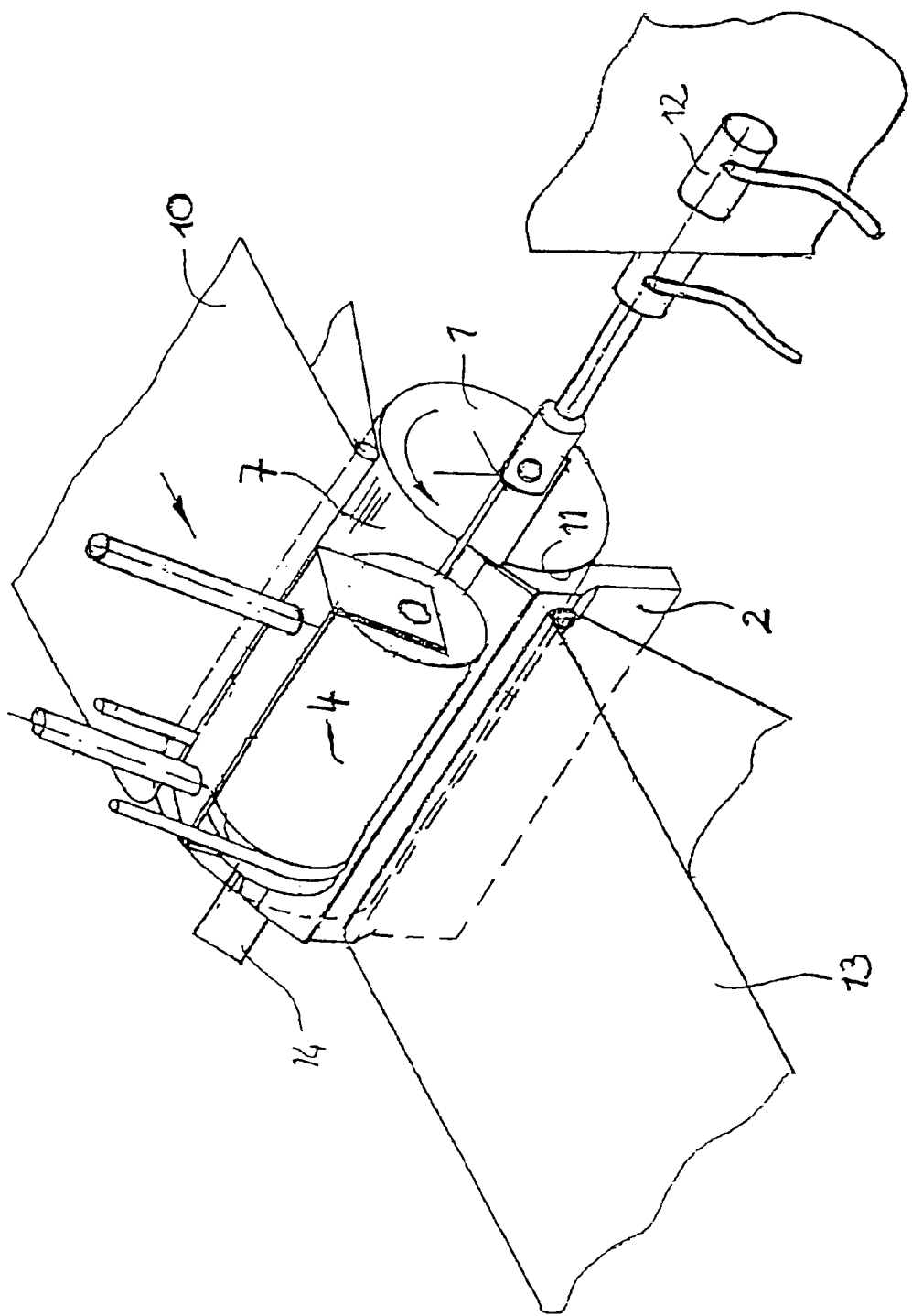

| | | |
|---|---|---|
| DE | 21 18 164 | 11/1972 |
| DE | 26 42 507 | 9/1977 |
| DE | 26 53 946 | 5/1978 |
| DE | 37 00 324 | 8/1987 |
| DE | 3617480 | * 11/1987 |
| DE | 3837181 | * 5/1990 |
| DE | 41 36 459 | 3/1993 |
| DE | 4304205 | * 8/1994 |

* cited by examiner

METHOD AND DEVICE FOR PROCESSING FILLETS OF FISH (CONVEYOR BELT FILLET PRODUCTION)

The invention concerns a method for processing fish fillets which include at least one skin layer constituting a waste layer and a fillet flesh layer constituting a useful layer as well as sinew and fat regions connecting the two layers, and are defined by a thinner tail end and a thicker head end opposite the tail end, by freeing the fillet flesh layer from the skin, fat and sinew components, wherein the fish fillets lying on the skin side are subjected to a brief pulling cut in the tail region, running to and fro transversely to a conveying direction, and then, continuing this cut, splitting separation by a stationary separating edge which, when the fillets approach, enters in the region of the pulling cut between skin and flesh layers and separates the two layers from each other, while at the same time a pull is exerted on the skin layer. Furthermore, the invention concerns an apparatus for carrying out such a processing method, including a skinning roller which substantially takes over the transport of the fillets during processing; a stationary separating tool in the form of a pressing shoe which lies with a pressing surface opposite the circumference of the skinning roller and which is designed with a separating edge for splitting separation of skin and flesh layers and is mounted so that its distance from the skinning roller is resiliently variable, and a cutting blade which with its cutting edge is movable back and forth relative to the separating edge.

Basically, in the removal of surface layers from fish fillets, which is generally also referred to as skinning, there is differentiation between two skinning methods which are different in function. These are on the one hand so-called standard skinning and on the other hand deep skinning. In standard skinning, the skin is pulled off by relative movement between the fillet on the one hand and a blunt or sharp edge on the other hand, essentially by an operation comparable to splitting in the region of the fat layer arranged between dermis and muscle flesh. The so-called silverskin remains on the fillet flesh. This silverskin is in many culture regions a criterion of the quality of the fish fillets ready for consumption. In deep skinning, on the other hand, in which the layer to be removed is adjusted in thickness, the silverskin for example is to be removed as well when it is unwanted, and edge regions of the muscle flesh can also be removed. In the process, with a stationary or oscillating sharp blade a thin slice of flesh containing the skin, sinews and fat and also containing inter alia the silverskin is cut off.

For purely standard skinning, apparatuses are known which work with a knife which can be referred to as blunt, which, as shown e.g. in DE-C-680 720, can be driven in oscillation. In such systems, the knife is switched from a retracted normal position, after passage of the fillet tip and entry thereof into an input gap which triggers a switching force, into the working position in which it penetrates from above through the fillet flesh as far as the skin of the tip and then, by the exertion of a pull on the skin, splits off the fillet including the silverskin from the waste layer underneath. At the fillet tip, flesh is cut off, leading to losses of yield of valuable fillet flesh.

Further, from publication DE 21 18 164 is known an apparatus with an oscillating skinning knife with reduced switching path, which can be moved into the working position by entry of the fillet into the gap between a skinning roller and a pressing shoe. Hence it is endeavoured to reduce the amount cut off as mentioned above.

The same purpose is served by an apparatus which works by the method described hereinbefore and is equipped with the characteristics listed there, known from DE 41 36 459 C1. After the cutting blade cuts into the end of the fillet, upon entry of the skin tip into the gap between entraining roller and pressing shoe there is generated a force which moves the pivotably mounted pressing shoe anti-clockwise against spring force as far as a stop. At the same time the cutting blade is moved back relative to the stationary separating edge of the pressing shoe, and clears it in order now to carry out splitting separation between skin and fillet. Since the blade, if there is no skin tip in the gap between pressing roller and pressing shoe, is always in the foremost position oscillating in front of the separating edge, and cuts before the skin end is gripped in the gap, it is possible for the tail end to run over the knife and not pass under it, and so a proper initial cut is not made. If gripping and cutting take place at an even later time, islands of skin are left on the fillet. After processing, the swung-out blade together with the pressing shoe must first be swung back into the starting position for the initial cut, so that unnecessary time is wasted before the next processing operation. It is not possible to arrange pressing means such as a roller over the cutting blade in the input region, that is, over the initial cutting blade, as known e.g. from DE 26 53 946, due to the permanent reciprocation of the blade and the risk that, when the blade is automatically switched back, with the elimination of the switching force after the skin leaves the gap, the blade will come into contact with such a pressing roller.

Then from DE 37 00 324 C2, for example, are known apparatuses which already aim in the direction of deep skinning and, instead of a knife referred to as blunt, carry a sharp, permanently oscillating blade on a pressing shoe. Here, however, the depth of penetration of the blade is fixed by adjustable stops, so that there is separation of the silverskin in thinner skin regions.

Inter alia, a skinning machine also with a permanently moving blade is known as typical of deep skinning, as shown by DE 1 810 673 B1. Here, throughout the skinning process the required pressure is exerted by a pressing roller working from above, to separate a layer of constant thickness.

In view of the fish flesh losses occurring in deep skinning owing to the layer of essentially uniform thickness which is removed, in many areas standard skinning is preferred to deep skinning especially with a view to a higher yield of fillet flesh. However, in this case at the output the skinned fillets are obtained only in a "loose heap", i.e. in complete disorder; partly lying one on top of the other, partly bent and undulating, for which various facts are responsible. The tail region of fillets is as a rule heavily traversed by sinews which have grown on the skin between the skin and the muscle layers defining the flesh. In standard skinning with a blunt or sharp skinning knife, these sinews are not reliably cut through between skin and flesh. On the contrary, they cling to the knife and lead to lateral forces which snatch the fillet from its path. This operation is often referred to as tearing in the technical jargon. Further, the above-mentioned sinews on the fillet continue into its edge regions, that is, the dorsal and ventral regions, this being with similar consequences corresponding to those mentioned above, by the fact that tearing of the fillet takes place at the edges due to uncut sinews. Lastly, due to fin or fishbone residues in the fillet, in these regions there are frequently elevated separation resistances which also move the end product out of its proper position. Of course, these factors can be reduced slightly with a sharp blade in standard skinning, but as a result islands of skin form on the fillet to an increased extent, which entails an even more undesirable effect with the requirement of increased subsequent trimming.

By contrast, it is the principal object of the invention to produce trim-free fish fillets, i.e. not needing subsequent processing, from raw fillet material provided with sinews between flesh and skin layers.

It is an essential further aim of the invention to skin the delicate flesh exposed by filleting as carefully as possible without impairment of quality, and to transfer it with straight alignment to a subsequent conveying, sorting and/or trimming table, in order to save time for the persons performing the last check for cleanness/quality of the fillets, as was done before by parting and aligning the fillets.

To achieve the object, with the method described hereinbefore it is provided that pressure is exerted on the flesh side of the fillet in the input region thereof against the separating edge, and the pulling cut is triggered under the control of a signal, effected in a few strokes and interrupted again immediately afterwards under the control of a signal, whereupon for continuation of the final separating operation the separating edge enters the region of the pulling cut between waste and useful layers.

With the apparatus described hereinbefore, the object is achieved by the fact that above the separating edge is arranged a pressing roller which is mounted pivotably about a shaft fixed to the apparatus; and that the pressing roller is operatively connected to a proximity switch which generates signals for movement of the cutting blade and thereby controls a mechanism for moving the blade.

In a preferred development of the method, the brief pulling cut can be made only after entry of the thinner tail end of the fillet in a gap which triggers pulling on the skin layer and after splitting initial cutting by the stationary separating edge with continuation of this initial cutting. Also, the brief pulling cut can preferably include one to three strokes, without this being seen as exclusivity or restriction with respect to the number of strokes; further, signal control of the pulling cut can be triggered by a signal derived from the exertion of pressure in the input region of the fillet against the separating edge, that is, by the change of pressure due to the increase of thickness of the fillet from the tail to the head end.

By means of these measures relating to method and apparatus it is possible that without noticeable loss of initial cutting, the moment the tail end of the approaching fillet passes under the pressing roller positioned close above the cutting edge of the skinning knife, not only is the fillet end introduced into the adjustable gap between the peripheral surface of the skinning roller and the pressing shoe, but at the same time due to deflection of the pressing roller by means of a signal generated thereby the activity of the cutting blade is triggered, which performs at least one or more strokes adjustable in number according to the consistency of the flesh to be processed or according to fish species, and by a pulling cut in the critical initial region reliably cuts through the sinews between flesh and skin, so that then the separating tool itself in continuation of this initial cut can accomplish clean separation of the useful layer, that is, the fillet flesh, from the waste layer, that is, skin, sinews and bone residues. The normal work cycle here is such that first a short piece of useful layer is split off from the skin by the separating edge of the pressing shoe, wherein the pressing roller is lifted by the fillet and triggers the control signal for the few strokes of the pulling cut. But if the pressing roller is shifted slightly further forward in a direction towards the arriving fillet, it is also possible and readily conceivable that the first cut of short standard splitting can be omitted and the initial cut can be made directly by means of the blade which is advanced out of its normal rest position behind the stationary separating edge of the pressing shoe and in the process is set in motion for the pulling cut only for a few strokes. These few strokes as a rule separate 3 to 5 cm of the useful layer of the tail region.

Advantageously, the duration and number of strokes of the initial pulling cut are adjustable, wherein, depending on the selected design for pressing roller loading, the exertion of pressure on the fillet in the region of the separating tool can be ended after the pulling cut, which if occasion arises forms the initial cut, and the blade on reaching the set number of strokes can return to its (retracted) starting position. For the apparatus it is particularly appropriate if the cutting blade lies with its cutting edge parallel to the separating edge of the pressing shoe and can be moved in guided fashion between its two end positions by means of guides arranged obliquely to this edge or extending arcuately. Thus the movement drive for the cutting blade can be arranged outside the function space and at the same time the condition for converting existing installations without this possibility of cutting or initial cutting can be fulfilled. As a result of the oblique arrangement of the guides for the cutting blade relative to the front edge of the pressing shoe or the direction of transport of the fillet, in relation to the actual skinning knife the action of the pulling cut is brought about to an increased extent or in a particularly simple and sensible manner.

For reasons of operational reliability and safety from accidents, advantageously the pressing shoe can be provided above as well as behind its cutting edge with a knife holding compartment which receives the cutting blade in covered fashion relative to the separating edge in the rest position and, upon extension into the working position, releases it.

To enable early gripping of the cutting blade, i.e. to enable, as indicated above, an initial cut by means of the blade already before a first attack of the separating edge, the pressing roller can preferably be arranged with its bearing working region relative to the fillet above the separating edge at a distance from the latter, seen in the direction of the arriving fillet, that is, advanced.

An appropriate mechanical component for performing the pulling cut proved to be the use of a fluid cylinder which via a linkage engages the blade, moves the latter in the direction of the skinning roller shaft, i.e. essentially parallel thereto, and is functionally connected to the proximity switch. Upon pivoting the pressing roller into its starting position, the activity of the cylinder is immediately stopped. The blade which is preferably guided on pins in the compartment in the pressing shoe can in this case be arranged in relation to the positions of the cylinder piston such that in the starting position of the cylinder it lies completely in the compartment, that is, retracted behind the separating edge, that is, the pressing shoe cover in this position receives the blade completely dissociated from its cutting function, whereas when the cylinder piston is extended the blade has moved furthest out of the compartment towards the fillet. On the other hand, with an arcuate or sickle-shaped design of the guides, the blade is retracted at the beginning of the stroke, then—roughly halfway through the stroke—extended in order to move back into the retracted position again on the closing part of the stroke. This movement cycle is repeated in the return stroke correspondingly (inversely).

To prevent tearing of the fillet by the skinning knife itself throughout the time of processing the fillet, for example triggered by sinew, bone or other waste regions present in the lateral dorsal and/or ventral regions, it is appropriately provided that the separated fillet on the discharge side behind the separating tool is transported straight by exertion of a pull from above and below across essentially the whole of its transverse extent. For this purpose, in the region behind the separating edge of the pressing shoe a fillet spreading roller can be arranged over the discharge surface of the fillet. To further increase the spreading effect in this case, the fillet spreading roller can be arranged over a discharge conveyor belt for the fillet, running in the same direction and at the same speed as the fillet, this speed being slightly higher than that of the skinning roller, so that a minimal pull which assists straightening is produced.

For the purpose of increasing the productivity of the apparatus according to the invention, two cutting blades can be arranged adjacent to each other in a direction perpendicularly to the conveying direction of the fillet. Thus the possibility of skinning fillets of a fish parallel to each other in a double stroke, as it were, is obtained without having to consider any switching times.

The advantages obtainable as a whole with the invention lie in that the useful layer can be separated from the waste layer in a controlled fashion in all processing regions of a fillet which are critical due to the natural structures, so that losses occurring as well as subsequent trimming requirements—and hence extra labour—are minimised. The structural expenditure required for carrying out these measures remains within the scope too and, due to their possibilities of being arranged for easy monitoring laterally and above the actual functional parts, still allow convenient access to them, in order to be able to work continuously during mass production even with two lines of apparatus working in parallel, and to eliminate interruptions occurring.

Figure 2:
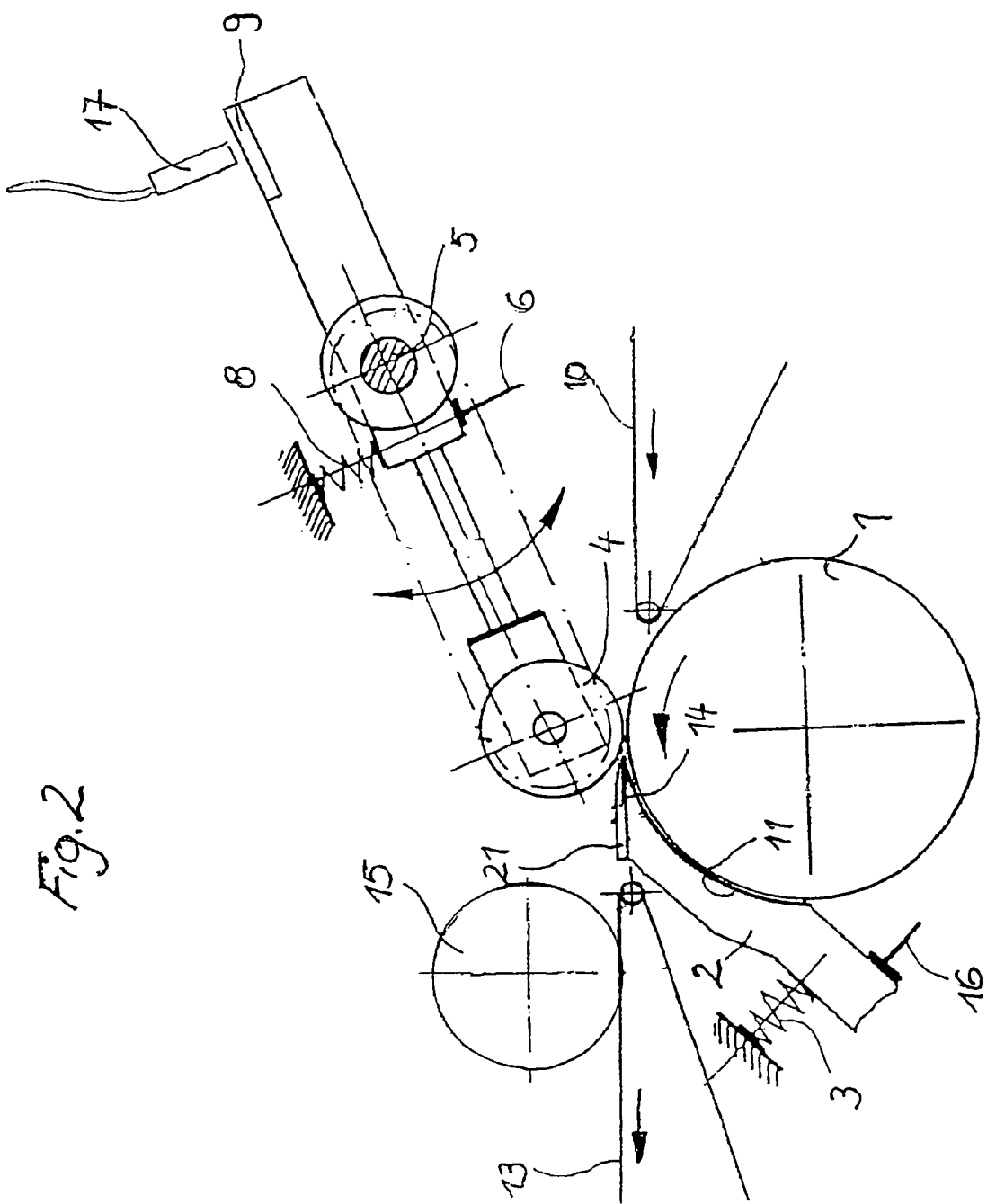
Figure 3:
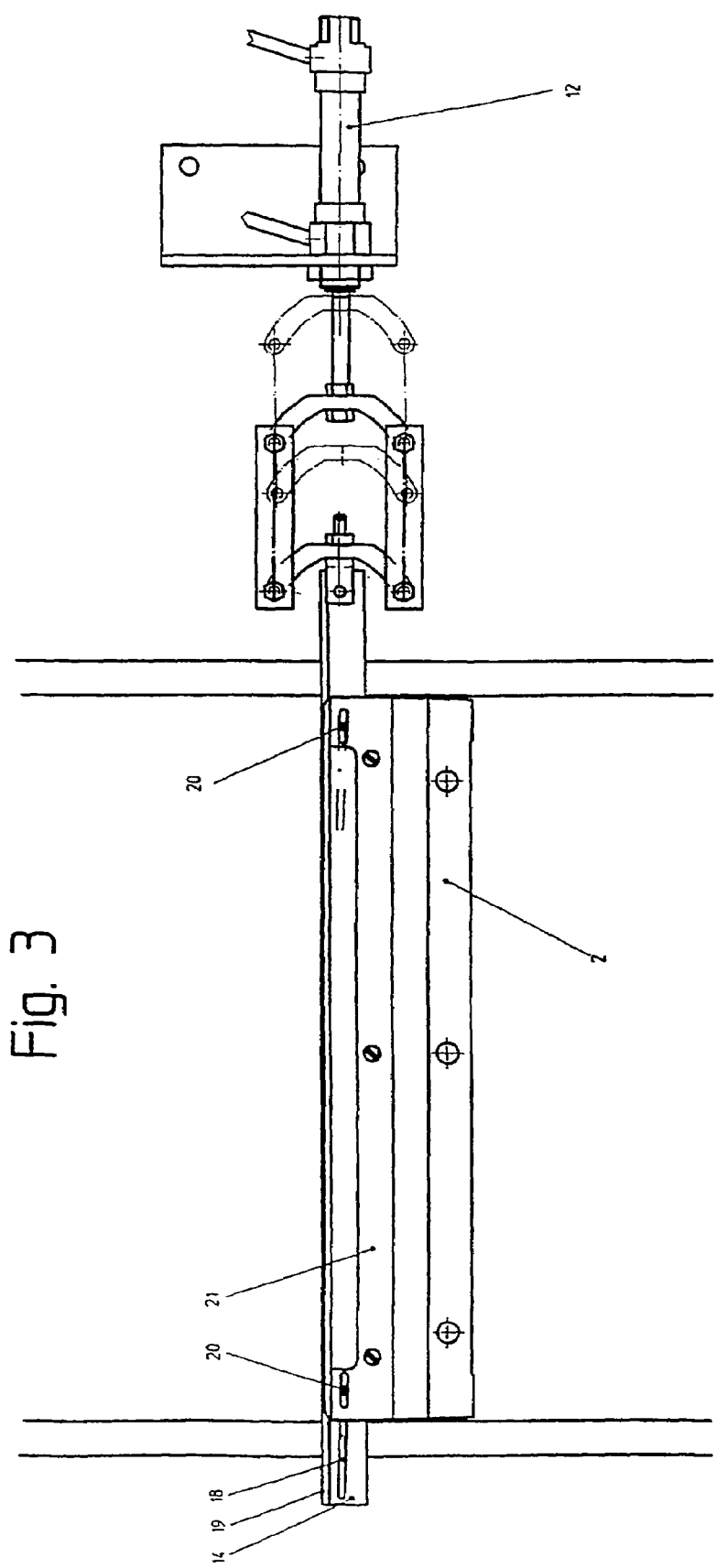
Figure 4:
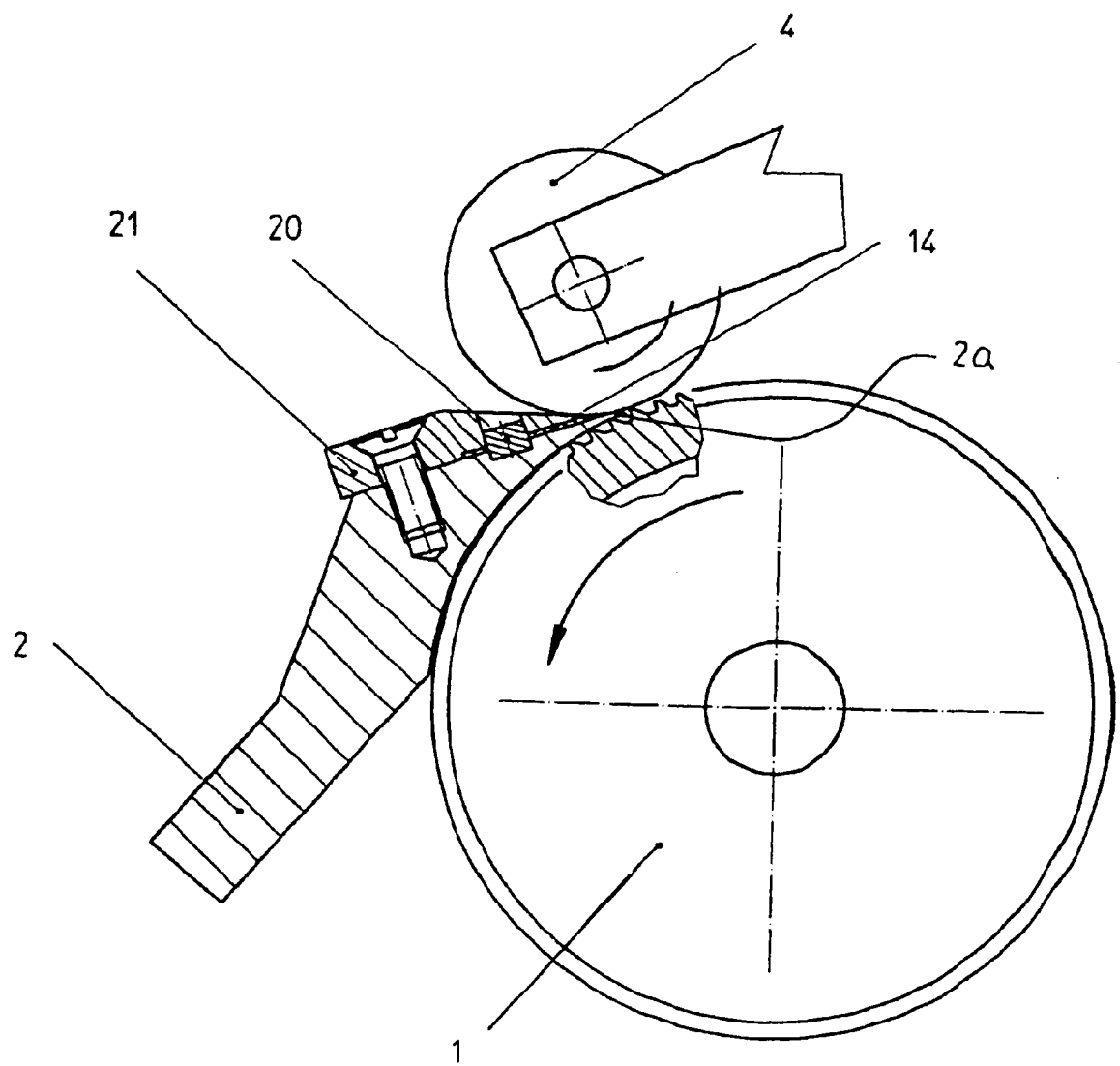

Further advantages and embodiments or possible constructions of the invention are apparent from the description below of the practical examples shown in the schematic drawings. They show:

FIG. 1 a diagrammatic partial view of in this case a single-lane embodiment of the present invention, omitting parts of the signal generating device, FIG. 2 a side view of the apparatus of FIG. 1, partly in section, but with the signal generating device, FIG. 3 a top view of the knife region and the mechanism for moving the initial cutting knife, and FIG. 4 an enlarged partial view in cross-section, but showing only skinning roller, knife and pressing roller.

As can be seen from the advantageous embodiment of the apparatus according to the invention shown in the figures, a machine for removing a surface layer from fish fillets, particularly in the form of the skin, in a machine frame not shown in more detail here for reasons of clarity comprises a rotationally driven skinning roller 1, a pressing shoe 2, a delivery belt 10 for fillets to be skinned, and a removal belt 13 for the skinned fillet. With this basic arrangement which is known in the art, the skinning roller 1 is driven rotationally and has good grip at its peripheral surface, as can be seen particularly well in FIG. 4, by the fact that the peripheral surface of the skinning roller 1 is provided with a plurality of grooves essentially extending in the longitudinal direction of the roller, if occasion arises sawtooth-shaped. Opposite this high-grip peripheral surface 7 of the skinning roller 1 is a correspondingly designed pressing surface of the pressing shoe 2 which, as can be seen from FIG. 2, is mounted so as to be displaceable relative to the peripheral surface 7 against the force of a spring 3. The pressing shoe 2 is constructed at its end located in a direction towards the delivery belt 10 with a separating edge 2a as shown. in FIG. 4, and above this with a compartment (not described in more detail) for receiving a blade-like (initial cutting) knife 14.

Above this region of separating edge 2a and blade 14 is arranged a pressing roller 4 which is mounted pivotablly about a shaft 5 (see FIG. 2) fixed to the frame and parallel to the axis of the skinning roller 1. It can be limited by an adjustable stop 6 in its movement in a direction towards the skinning roller 1, and pivoted away from the skinning roller 1 against the force of a spring 8 or, for example, also a magnet which is not used in the present embodiment. To monitor the pivot movement of the pivot arm carrying the pressing roller 4 and not described in more detail about the shaft 5, there is provided a proximity switch 17 fixed to the frame, which cooperates with a corresponding switching lug 9 at the free end of this pivot arm and monitors when the pressing roller is to be deflected. When it returns back to its starting position is as a rule determined by passage of the fillet.

The structure of the device actuating the blade 14 can be seen in particular from looking at FIGS. 3 and 4. Thus, this blade 14 is attached to a cylinder 12 fixed to the frame by a guiding and moving device not described in more detail here, and axially slidable in the holding compartment of the pressing shoe 2 by guide grooves 18 arranged obliquely to its cutting edge 19. Due to the oblique position of these guide grooves relative to the separating edge 2a of the pressing shoe, during axial displacement of the blade 14 on pins 20 provided for this purpose the blade is moved out of its starting position behind the edge 2a of the pressing shoe 2 to a position in front of it, whereas upon retraction it moves back into the holding compartment which is formed between a pressing shoe cover 21 and the pressing shoe 2 itself.

According to a variant not shown in more detail by drawings here, guiding of the blade 14 can also be provided so that the relative movement of guide grooves 18 and pins 20 follows a (flat) arc or path curved in some other way, such that during axial displacement the blade is moved out of the compartment on part of its path and then back into it. Whereas in this case normally the highest guide point of the arc/curve, i.e. the point furthest forward towards the front edge of the pressing shoe 2, roughly corresponds to the centre of the piston stroke, and the rearward end points of the arc define the input positions of the blade at the beginning and end of the piston stroke, a construction of such a curved guide which is inverted in comparison with this is of course conceivable.

The manner of operation of this apparatus is as follows. A fish fillet to be processed is laid on the delivery belt 10 with its skin surface underneath and tail first, and moved by this belt in a direction towards the separating device 2, 14. On leaving the delivery belt 10, first the tail end runs onto the peripheral surface 7 of the skinning roller 1, which rotates in the direction of the arrow, and passes under the pressing roller 4 rotating in the same direction and located close above the separating edge 2a, with the result that this end is guided into the gap adjustable by the stop 6 between the peripheral surface of the skinning roller 1 and the pressing surface of the pressing shoe 2 opposite it. Shortly thereafter, the edge 2a of the pressing shoe 2 begins to detach the useful layer of the fillet from the skin, wherein practically at the same time the pressing roller 4 is lifted against the force of the spring 8 and in the proximity switch 17 a signal is generated. This signal controls the operation of the actuating cylinder 12, this being in such a way that the latter performs at least one, but if necessary, depending on the conditions in the tip of the fillet, several strokes. The duration and number of strokes are adjustable. Owing to the oblique position of the guide grooves 18, the initial cutting blade 14 performs an efficient pulling cut by which the sinews are reliably cut through in a predefined region about 3 to 5 cm long between flesh and skin. At the end of this pulling cut by means of the blade 14 on reaching the set number of strokes, the (stationary) cutting edge or separating edge 2a then undertakes the further separating operation. The flesh is guided onto the removal belt 13, which is arranged directly behind the pressing shoe, while the skin is moved through in the gap 11 between the peripheral surface 7 of the skinning roller 1 and the pressing surface of the pressing shoe 2.

As can be seen from FIG. 2, above the removal belt 13 just behind the pressing shoe is positioned a further pressing roller 15 which comprises a soft, resilient surface and serves to prevent tearing of the fillet throughout processing of the fillet by the cutting edge 2a, by exerting an even pressure on the fillet and so smoothing it in conjunction with the removal belt 13, so that sinews and bone regions arranged in the lateral regions of the fillet, that is, on the ventral and dorsal sides, can also be reliably cut through and off.

It goes without saying that in a larger fish processing plant several of the apparatuses according to the invention can be arranged adjacent to each other, so that processing can be effected in several lanes. But above all two blades 14 can be arranged in an apparatus adjacent to each other, so that they can be actuated by two cylinders 12 provided on opposite sides, and the two fillets of a fish can easily be skinned simultaneously.

The invention claimed is:

1. A method for processing fish fillets using a processing apparatus, wherein the fillets include at least one skin layer and a fillet flesh layer as well as sinew and fat regions connecting the two layers, and are defined by a thinner tail end and a thicker head end, the method comprising freeing the fillet flesh layer from the skin, fat and sinew components, wherein the fish fillets lying on the skin side are subjected to a brief pulling cut in the tail region, by a cutting edge moving transversely back and forth relative to a conveying direction to form a transverse pulling cut, and then, splitting separation by a stationary separating edge of said apparatus which, when the fillets approach, enters in the region of the pulling cut between said skin and flesh layers and separates the two layers from each other, while at the same time a pull is exerted on the skin layer by the apparatus, characterized in that pressure is exerted by a pressing roller on the flesh side of the fillet in an input region thereof against the separating edge, and the pulling transverse cut is triggered under the control of a signal generated by movement of the pressing roller upon contact with the flesh side of the fillet, effected in at least one stroke and interrupted again immediately afterwards under the control of the signal, whereupon the separating edge enters the region of the transverse pulling cut between said skin and flesh layers for continuation of a final separating operation to separate the skin and flesh layers.

2. A method according to claim 1, characterized in that the brief transverse pulling cut is made only after entry of the thinner tail end of the fillet in a gap which triggers pulling on the skin layer and after splitting initial cutting by the stationary separating edge with continuation of this initial cutting.

3. A method according to claim 1, characterized in that the brief transverse pulling cut includes one to three strokes.

4. A method according to claim 1, characterized in that the signal control of the transverse pulling cut is triggered by a change of pressure in the input region of the fillet against the separating edge.

5. A method according to claim 1, characterized in that the exertion of pressure on the fillet in the region of the separating edge is ended after the transverse pulling cut.

6. A method according to claim 1, characterized in that the separated fillet on a discharge side behind the separating edge is transported straight by exertion of a pull from above and below across essentially the whole of its transverse extent.

7. An apparatus for processing fish fillets which include at least one skin layer and a fillet flesh layer as well as sinew and fat regions connecting the two, and which have a thinner tail end and a thicker head end, by separating these two layers from each other, including
    a skinning roller (1) which substantially takes over the transport of the fillets during processing;
    a stationary separating tool in the form of a pressing shoe (2) which has a pressing surface opposite the circumference of the skinning roller and which is designed with a separating edge (2a) for splitting separation of said skin and flesh layers and is mounted so that its distance from the skinning roller is resiliently variable; and
    a cutting blade (14) having a cutting edge and which is independently movable transversely back and forth relative to a conveying direction and relative to the separating edge (2a), characterized in that above the separating edge (2a) is arranged a pressing roller (4) which is mounted pivotably about a shaft (5) fixed to the apparatus; and in that the pressing roller (4) is operatively connected to a proximity switch (17) which generates signals upon movement of the pressing roller (4) for controlling a mechanism (12) for moving the cutting blade (14) independently transversely back and forth relative to the conveying direction and relative to the separating edge (2a).

8. An apparatus according to claim 7, characterized in that the cutting blade (14) lies with its cutting edge parallel to the separating edge (2a) of the pressing shoe (2) and is moved by means of guides arranged obliquely to the separating edge, guided between its two end positions.

9. An apparatus according to claim 7, characterized in that the pressing shoe (2) is provided above as well as behind its separating edge (2a) with a knife holding compartment which receives the cutting blade (14) in covered fashion relative to the separating edge (2a) in the rest position and releases it in a working position.

10. An apparatus according to claim 7, characterized in that the pressing roller (4) is arranged with its bearing working region relative to the fillet above the separating edge (2a) at a distance from the separating edge, seen in the direction of the arriving fillet.

11. An apparatus according to claim 7, characterized in that the mechanism is a fluid cylinder (12) which via a linkage engages the blade (14), moves the latter essentially parallel to the skinning roller shaft (5), and is functionally connected to the proximity switch (17).

12. An apparatus according to claim 7, characterized in that in the region behind the separating edge (2a) of the pressing shoe (2) and over the discharge surface of the fillet is arranged a fillet spreading roller (15).

13. An apparatus according to claim 12, characterized in that the fillet spreading roller (15) is arranged over a discharge conveyor belt (13) for the fillet, running in the same direction and at the same speed as the fillet, this speed being slightly higher than that of the skinning roller (1).

14. An apparatus according to claim 7, characterized in that two cutting blades (14) are arranged adjacent to each other in a direction perpendicularly to a conveying direction of the fillets.

* * * * *